UNITED STATES PATENT OFFICE.

HENRY W. MERRITT, OF SOMERVILLE, ASSIGNOR TO WILLIAM H. IRELAND, OF BOSTON, MASSACHUSETTS.

SEMI-ELASTIC COMPOUND FOR COVERING ELECTRIC WIRES, &c.

SPECIFICATION forming part of Letters Patent No. 366,337, dated July 12, 1887.

Application filed February 12, 1887. Serial No. 227,438. (No specimens.)

*To all whom it may concern:*

Be it known that I, HENRY W. MERRITT, of Somerville, in the county of Middlesex and State of Massachusetts, have invented a new and useful Improvement in Semi-Elastic Compounds, of which the following is a specification.

The object of my invention is to form a mixture which shall constitute a compound that is quite flexible and yet capable of resisting considerable pressure or strain; also of the nature to resist heat and cold and to be a non-conductor of electricity; also to be of such a nature as to be quite fluid when hot.

This invention I put in practice by mixing its several ingredients in accordance with the following formula: First, I dilute two pounds of the fluid silicate of soda with one quart of water. I then add one pound of fir-balsam, Burgundy-pitch, or an equivalent of some pitch compound, having the whole mass quite hot, so as to make a complete union of the ingredients. Into this mass I stir four pounds of ground asbestus or its equivalent of neutral earths. I then add one ounce of sugar, sorghum, or glucose, and when all the ingredients are thoroughly incorporated I make a saturated solution containing about three grains of oxalic acid dissolved in hot water, and add this to the compound.

This compound is used for filling pipes that inclose electric wires, for uniting metals or metals and wood, and for such other uses as a semi-elastic adhesive compound may be required for.

I claim—

The compound above described, consisting of silicate of soda, fir-balsam or an equivalent, asbestus, sugar, and oxalic acid, and water, compounded substantially as described, and for the purpose set forth.

HENRY W. MERRITT.

Witnesses:
W. H. NOONAN,
WILLIAM EDSON.